United States Patent Office 2,880,582
Patented Apr. 7, 1959

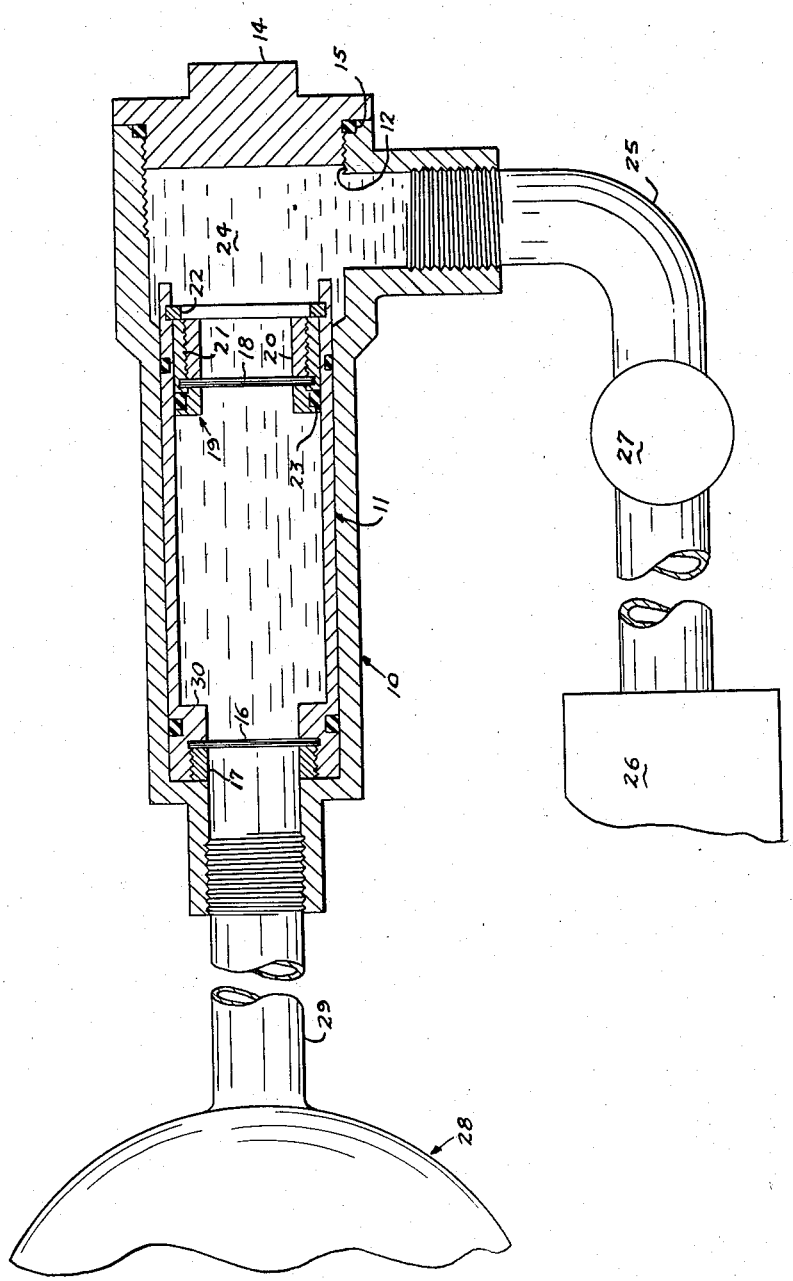

2,880,582

STARTING ASSEMBLY FOR A POWER PLANT

Clement J. Turansky, Tonawanda, and Sylvester J. Pirrone, Buffalo, N.Y., assignors to the United States of America as represented by the Secretary of the Air Force Application April 19, 1956, Serial No. 579,408

5 Claims. (Cl. 60—39.48)

This invention relates to a starting assembly for a power plant and, more particularly, to a starting mechanism for a combustion chamber of a rocket engine that supplies a predetermined quantity of starting fuel to the rocket engine.

One method of starting a rocket engine is by first supplying a starting fuel to the combustion chamber of the engine and then supplying an operating or running fuel after the starting fuel has been ignited in the engine. In previous systems, the starting fuel was supplied by filling start-fuel lines. However, this was disadvantageous since it was not always possible to accertain either the quantity of starting fuel or its location in the lines prior to firing the rocket engine. The prese t invention eliminates these disadvantages by providing a fixed quantity of starting fuel with a known location.

Another problem previously encountered was that the operating fuel might mix with the starting fuel before the starting fuel entered the injector head resulting in an insufficient amount of starting fuel being available to start the rocket engine; this, of course, could cause an explosion. The present invention solves this problem by insuring that the starting fuel is supplied to the combustion chamber of the rocket engine before the operating fuel is released for injection to the combustion chamber.

An object of the present invention is to provide a starting system for a power plant such as a rocket engine that sequentially supplies the starting fuel and the operating fuel.

Another object of this invention is to provide a starting system for a power plant such as a rocket engine that supplies a fixed quantity of starting fuel to the engine.

Other objects of this invention will be readily perceived from the following description.

This invention relates to a starting assembly comprising a housing having means therein that contain a starting fuel. The housing also has a chamber therein to which an operating fuel is supplied. Means in the housing control communication between the chamber and the means containing the starting fuel. The starting fuel in the containing means is supplied to a power plant or the like at a predetermined pressure by suitable means. The control means permits communication between the chamber and the containing means at a predetermined pressure after the starting fuel has been released to supply the operating fuel from the chamber through the containing means to the power plant.

The single figure of the attached drawing is a sectional view illustrating a preferred embodiment of the present invention.

Referring to the drawing, there is shown a housing 10 of a starting assembly for use with a rocket engine. A cylinder 11, which contains starting fuel for starting the rocket engine, is disposed within the interior of the housing 10. The cylinder 11 is inserted into the interior of the housing 10 through an opening 12, which is closed by a cap 14. The cap 14 is threaded into the end of the housing 10 and holds a packing member 15 therebetween to prevent leakage between the cap 14 and the housing 10.

One end of the cylinder 11 is closed by a rupturable wall member 16, which is fixed in the cylinder 11 by a nut 17 threaded into the end of the cylinder 11. The other end of the cylinder 11 is closed by a movable rupturable wall member 18. The movable member 18 is attached to a slidable piston member 19 by a nut 20 threaded into a flange 21 of the piston member 19. The piston member 19 moves within the interior of the walls of the cylinder 11. The piston member 19 is limited in its movement to the right, as shown in the drawing, by a stop member 22 such as a ring imbedded within the wall of the cylinder 11. The cylinder 11 is filled with the starting fuel prior to securing the rupturable wall member 16 in the end of the cylinder 11 by the nut 17. A packing member 23, which provides a seal between the piston member 19 and the cylinder 11, prevents leakage of the starting fuel from the interior of the cylinder 11 between the movable piston member 19 and the wall of the cylinder 11.

After the cylinder 11 has been positioned in the housing 10, a chamber 24 is formed in the housing with the movable rupturable wall member 18 serving as a wall of the chamber 24. A conduit 25 connects the chamber 24 with the tank 26, which contains the operating or running fuel for the rocket engine. A valve 27 in the conduit 25 controls the flow of operating fuel to the chamber 24 from the tank 26.

A combustion chamber 28 of a rocket engine is connected to the housing 10 through a conduit 29. The starting fuel flows from the housing 10 to the combustion chamber 28 through the conduit 29.

Considering the operation of the present invention, the cylinder 11 is filled with a starting fuel prior to securing the rupturable wall member 16 to the cylinder 11 by the nut 17. The amount of starting fuel in the cylinder 11 depends on the quantity required to start combustion in the combustion chamber 28 of the rocket engine. However, the cylinder 11 cannot be completely filled since there must be sufficient space for thermal expansion of the starting fuel prior to its use. The cylinder 11 is filled at a remote filling station so that a sufficient quantity of these cartridge type cylinders may be stored for use. The cylinder 11 is disposed within the interior of the housing 10 through the opening 12. The housing 10 is located between the tank 26, which contains the operating fuel for the rocket engine, and the combustion chamber 28 of the rocket engine. After the cylinder 11 is disposed within the housing 10, the opening 12 is closed by threading the cap 14 into the end of the housing 10.

When it is desired to start the rocket engine, the valve 27 in the conduit 25 is opened to permit the flow of operating fuel from the tank 26 to the chamber 24. As the operating fuel fills the chamber 24, the pressure therein increases and moves the piston member 19 and the rupturable member 18 to the left; this compresses the starting fuel within the interior of the cylinder 11 since the rupturable wall member 16 is fixed. As the piston member 19 and rupturable member 18 continue to move to the left, as viewed in the drawing, due to the pressure in the chamber 24 increasing, the pressure within the interior of the cylinder 11 continues to increase as the volume is decreased. At a predetermined pressure of the starting fuel in the interior of the cylinder 11, the wall member 16 ruptures and the starting fuel flows therefrom through the conduit 29 to the combustion chamber 28 for ignition in the combustion chamber upon contact with the oxidizer in the combustion chamber. As soon as the starting fuel is pushed out of the cylinder 11, the piston member 19 moves rapidly to the left until it abuts against a shoulder 30 of the cylinder 11. As soon as the movement of the piston member 19 is stopped by the shoulder 30, the pressure of the operating fuel within the chamber 24, which has expanded since the movable wall member 18 forms a wall thereof, ruptures the wall member 18 and the operating fuel follows directly behind the slug of starting fuel into the combustion chamber 28 through the conduit 29 to continue the combustion process.

Thus, it will be seen that the present invention supplies both the starting fuel and the operating fuel sequentially without mixture prior to their entering the combustion chamber. It will be readily observed that the device is again ready for operation as soon as the cap 14 is removed from the end of the housing 10, the cylinder 11 is withdrawn, another new cylinder is disposed within the housing, and the cap 14 threaded on the end of the housing 10.

An advantage of the present invention is that it reduces the starting fuel maintenance and handling costs since the filling of the starting unit is done visibly and the required quantity is supplied. Another advantage of this invention is that the starting fuel cartridge may be filled before use and stored in a suitable place indefinitely. When a plurality of repeated tests is desired, it will be readily seen that the present invention reduces the time interval between tests. A further advantage of this invention is that it eliminates the possibility of the operating fuel mixing with a major portion of the starting fuel before injection into the combustion chamber of the engine; if such a mixture occurs, starting may be prevented and an explosion might result therefrom.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. A starting assembly comprising a housing, means within the housing for containing a starting fuel, the containing means including a movable wall, the housing having a chamber in communication with the movable wall, means to supply operating fuel to the chamber to move the movable wall whereby the starting fuel in the containing means is released for supply to a power plant or the like for starting, and means in the movable wall to release the operating fuel from the chamber through the containing means to the power plant after the starting fuel has been supplied to the power plant.

2. A starting assembly comprising a housing, means disposed within the housing for containing a starting fuel, the containing means including a movable wall and a fixed wall spaced from each other, the movable wall having a rupturable portion, the fixed wall having a rupturable portion, the housing having a chamber, the movable wall forming one of the walls of the chamber, and means to supply operating fuel to the chamber to move the movable wall to first rupture the rupturable portion of the fixed wall to supply the starting fuel to a power plant or the like and then to rupture the rupturable portion of the movable wall to supply the operating fuel to the power plant.

3. In a starting system for admitting a starting fuel and an operating fuel sequentially to a combustion chamber including a housing having a chamber communicating with a source of operating fuel under pressure, an outlet conduit connected to said housing, a piston reciprocable in said housing and adapted to isolate said chamber from communication with said outlet conduit, said piston having a flow passage therethrough and a rupturable diaphragm sealing said flow passage, means for maintaining a supply of starting fuel in said housing and in contact with said piston, the inlet of operating fuel under pressure to said housing causing said piston to drive the starting fuel into the outlet conduit and a predetermined rise in operating fuel pressure rupturing the diaphragm seal in said piston and permitting flow of operating fuel through said piston flow passage to said outlet conduit.

4. In a starting system for admitting a starting fuel and an operating fuel sequentially to the combustion chamber of a rocket engine, a conduit connecting the source of operating fuel under pressure to the engine combustion chamber, a starting fuel container positioned in said conduit and normally blocking the operating fuel flow therein, the container being in the form of a cylinder having one end sealed with a rupturable diaphragm, said container being substantially filled with a starting fuel supply and closed at its other end by a piston reciprocable in the container, said piston having a central flow passage therein sealed by a rupturable diaphragm, admission of operating fuel under pressure to said conduit causing movement of said piston to first cause rupture of said first named diaphragm and continued movement to force the starting fuel into the conduit, said container having stop means to limit the travel of the piston, the diaphragm seal in said piston rupturing upon engagement with said stop to thereby permit flow of operating fuel through said piston flow passage behind said starting fuel without appreciable admixture of the fuels.

5. A starting assembly for admitting a starting fuel and an operating fuel sequentially to a rocket engine combustion chamber comprising a housing having a cylindrical bore therein, a delivery conduit leading from said housing and communicating with one end of said bore, an inlet conduit connected to said housing for admitting operating fuel under pressure to the other end of said bore, a removable closure in said housing for removably admitting a cylindrical starting fuel container into said bore, said starting fuel container being substantially filled with the starting fuel, a rupturable diaphragm sealing one end of the container, a piston sealing the other end of the container and reciprocable therein, and a stop in said container limiting the movement of said piston, said piston having a central passage therein closed by a rupturable diaphragm of higher burst strength than said first named diaphragm, admission of operating fuel under pressure to said housing causing said piston to compress the starting fuel and rupturing the diaphragm and seal of said container, continued movement of said piston expelling the starting fuel, the diaphragm seal in said piston rupturing when said piston engages the stop to thereby permit the operating fuel supply to follow the starting fuel with substantially no admixture.

References Cited in the file of this patent

UNITED STATES PATENTS

| | | |
|---|---|---|
| 2,402,826 | Lubbock | June 25, 1946 |
| 2,505,798 | Skinner | May 2, 1950 |
| 2,557,120 | Knoblock | June 19, 1951 |
| 2,601,607 | Halford et al. | June 24, 1952 |
| 2,637,161 | Tschinkel | May 5, 1953 |
| 2,701,441 | Mitchell | Feb. 8, 1955 |
| 2,711,630 | Lehman | June 28, 1955 |
| 2,753,801 | Cumming | June 10, 1956 |